April 18, 1933.                L. L. BREDIN                1,904,968
                          AUTOMOBILE WINDOW SCREEN
                            Filed March 13, 1929

INVENTOR.
Lewis L. Bredin
BY
ATTORNEY.

Patented Apr. 18, 1933

1,904,968

UNITED STATES PATENT OFFICE

LEWIS L. BREDIN, OF DETROIT, MICHIGAN, ASSIGNOR TO CHAMBERLIN METAL WEATHERSTRIP CO., OF DETROIT, MICHIGAN, A CORPORATION OF MICHIGAN

AUTOMOBILE WINDOW SCREEN

Application filed March 13, 1929. Serial No. 346,549.

This invention relates to automobile window screens and the object of the invention is to provide a roller type screen for closed automobile bodies in which the screen may be connected to a window glass and drawn downwardly therewith to screen the opening.

Another object of the invention is to provide a means cooperating with the channel in which the glass rides for maintaining the screen taut and sealing the screen at the edges to prevent entrance of insects about the edges of the screen.

These objects and the several novel features of the invention are hereinafter more fully described and claimed and the preferred form of construction by which these objects are attained is shown in the accompanying drawing in which—

Figure 1:
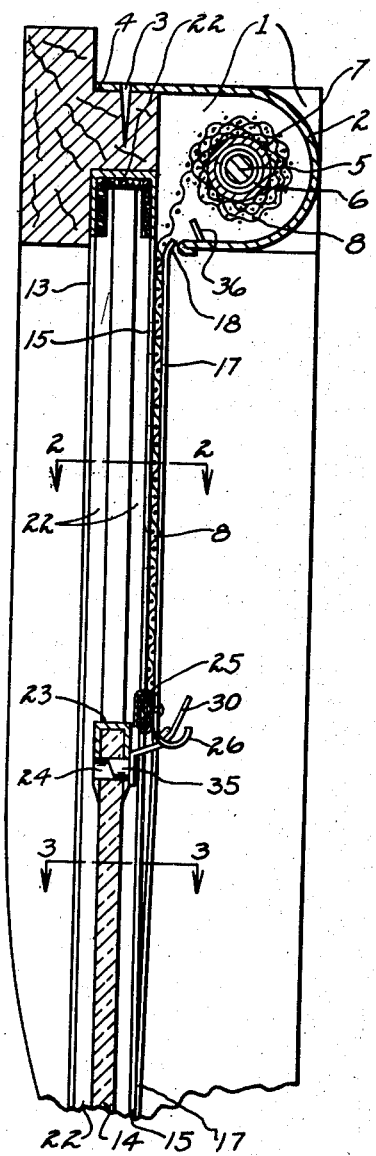
Fig. 1 is a vertical section of an automobile door showing my improved window screen and guide channels therefor.

The device is adapted for use on an automobile door or window and in order to fit the device into the door the top rail is recessed at 1 between the stiles to receive the metal housing 2. This housing is secured to the door by the nails 3 which extend through the flange 4 of the housing to secure the housing in place. Within the housing is a stationary shaft 5 having a coiled spring 6 thereabout and a metal tube 7 is provided about the coiled spring. The screen 8 is soldered at one end to the tube 7 and the tube 7 is rotatable about the shaft 5 while the coiled spring 6 is secured at one end to the tube 7 and at the opposite end to the stationary shaft 5. By this arrangement when the screen is drawn off from the roll the tube 7 is rotated about the shaft 5 thus winding up the spring 6 which yieldingly resists withdrawal of the screen from the roll.

Figure 2:
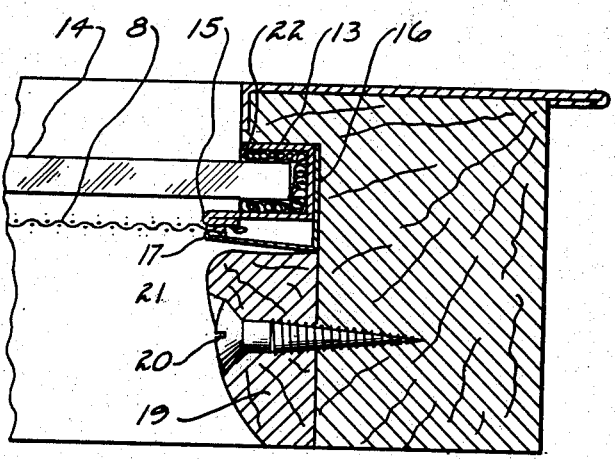
Fig. 2 is a horizontal section taken on line 2—2 of Fig. 1.
Figure 3:
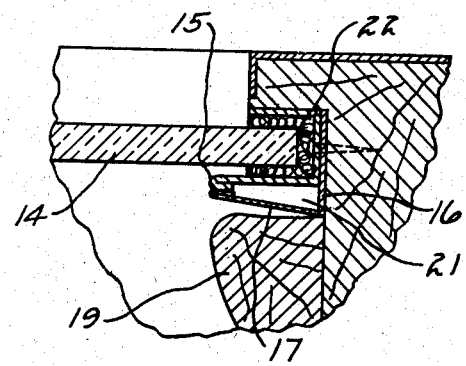
Fig. 3 is a horizontal section taken on line 3—3 of Fig. 1.

In order to provide a guide for the edges of the screen the channel 13 in which the window glass 14 rides is provided with an outwardly extending flange 15 shown in Figs. 2 and 3 and an L shaped spring bronze strip 16 is secured beneath the channel 13 and is provided with an angularly extending flange 17 which normally extends into contact with the flange 15 of the channel 13 as shown in Fig. 3. This member 16 is made of spring bronze and, as shown in Fig. 1, is curved inwardly at the upper end 18 to allow the screen to be readily fed into the channel between the flanges 17 and 15. After the member 16 has been secured in place the trimming strip 19 is secured to the door frame by the screws 20. As the screen is drawn down through the channel 21 formed by the flanges 15 and 17 the flange 17 maintains a pressure on the edge of the screen and thus seals the screened opening at the edges and at the same time maintains the screen 8 taut. A U shaped resilient lining 22 is positioned in the channel 13 in which the glass 14 rides and this protects the glass from breaking.

In Fig. 2 I have also shown a convenient arrangement for operation of the screen member. This consists of a notch 24 in the upper edge of the glass and frame 23 therefor. On raising the sash to closed position the upper edge of the arm 30 of the latch engages the lug 36 which disengages the latch and screen from the sash. By moving the window downward the proper distance and by grasping the bracket or hook element 26 and drawing the screen downwardly until the latch 30 is disengaged from the lug 36, the end 35 of the latch may be moved to engage in the aperture 24 of the window. Subsequent lowering of the sash therefore draws the screen member downwardly with its edges in the guide channels on opposite vertical sides of the window opening formed by the members 15 and 17.

It will be evident from the foregoing that the arrangement described of the glass channel 13 and the flange 15 and the resilient flange engaging therewith both flanges being positioned in the recess formed between the parting strip 19 and the glass channel that I have provided a very simple and inexpensive construction as well as one that is efficient in use.

Upon subsequent downward movement of the window the catch does not engage in the aperture 24 but by grasping the curved flange 27 of the bracket 26 and drawing the lower edge of the screen downwardly until the latch 30 is disengaged from the lug 36 the flat spring 33 throws the end 35 of the latch into position to engage in the aperture 24 of the window. At this time by moving the window downwardly, until the aperture 24 is opposite the end 35 of the latch, the spring 34 will throw the end 35 of the latch into the aperture 24 thus securing the screen to the window. If it is desired to release the screen when in the lowered position such as shown in Fig. 2 the operator may press inwardly on the upper end of the latch 30 thus disengaging the end 35 from the window at which time by releasing the screen the spring 6 will roll the screen up to the position shown in Fig. 3.

From the foregoing description it becomes evident that the device is very simple and efficient in operation, will not easily get out of order, is concealed when not in use and provides a device which accomplishes the objects described.

Having thus fully described my invention, its utility and mode of operation, what I claim and desire to secure by Letters Patent of the United States is—

1. In a window having a frame member formed with a rabbet providing an L shaped recess extending from one edge thereof toward the other and having a side and a bottom face at a right angle one to the other, a U shaped channel in the recess having one of its side walls engaging the said side of the recess and its base supported by the bottom face thereof, said channel providing a runway for a glass, an L shaped sheet metal member having its base secured between the channel member and bottom face of the rabbet and extending outwardly beyond the said base of the channel member and further having a resilient flange positioned at an angle to the other side wall of the channel member with the edge thereof engaging the said last named side wall of the channel at approximately its edge and in conjunction therewith providing a runway for a screen, and a finish strip secured to the said bottom face of the recess and being of a thickness approximately equal to the width of the said flange and having its inner edge at the point of contact with the bottom face of the rabbet lying practically in engagement therewith.

2. In a window having a frame member formed with a rabbet providing an L shaped recess extending from one edge thereof towards the other and having a side and a bottom face, at a right angle one to the other, a U shaped channel member in the recess having one of its side walls engaging the said side of the recess and its base supported by the bottom face, thereof, the other side wall of the channel being of greater width than the first named side wall thereof, and providing a runway for a glass, an L shaped member of resilient sheet metal having its base secured between the channel member and the bottom face of the rabbet and extending outwardly therefrom in engagement with said bottom face of the rabbet to beyond the base of the channel member, the flange of the L shaped member extending outwardly from the base portion at an angle thereto less than a right angle with its outer edge engaging approximately the edge of the said longer side wall of the channel member and providing in conjunction therewith a runway for a screen, and a finish strip secured to said bottom face of the recess, the side thereof facing the channel member being approximately in parallel, spaced relation therewith providing a recess within which the flange of the L shaped member is positioned.

3. In a window having its side members each formed with a rabbet providing an L shaped recess extending in each case from one edge of a member toward the other and providing a side and a bottom face of the recess at a right angle one to the other, a glass channel supported in the recess and against the said side thereof, a finish strip secured to the bottom face of the recess at a distance from the channel, the inner edge of the finish strip in conjunction with the glass channel providing a second channel, and resilient means in the said second channel providing in conjunction with the glass channel a runway for opposite edges of a screen.

In testimony whereof I sign this specification.

LEWIS L. BREDIN.